(12) United States Patent
Sriperambudur et al.

(10) Patent No.: US 12,298,877 B2
(45) Date of Patent: May 13, 2025

(54) SYSTEM AND METHOD FOR PROVIDING AUTOMATIC DIAGNOSTICS OF API CONFIGURATION

(71) Applicant: BANK OF AMERICA CORPORATION, Charlotte, NC (US)

(72) Inventors: Sunil Kumar Sriperambudur, Hyderabad (IN); Siva Kishore Nandikolla, Hyderabad (IN); Jyoti Ranjan Mohapatra, Hyderabad (IN); Bhavna Sagar Badri, Maharashtra (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 597 days.

(21) Appl. No.: 17/668,651

(22) Filed: Feb. 10, 2022

(65) Prior Publication Data
US 2023/0251948 A1 Aug. 10, 2023

(51) Int. Cl.
G06F 11/30 (2006.01)
G06F 9/445 (2018.01)
G06F 9/54 (2006.01)

(52) U.S. Cl.
CPC ...... *G06F 11/3079* (2013.01); *G06F 9/44505* (2013.01); *G06F 9/547* (2013.01); *G06F 11/302* (2013.01); *G06F 11/3075* (2013.01)

(58) Field of Classification Search
None
See application file for complete search history.

(56) References Cited

U.S. PATENT DOCUMENTS

| 7,812,717 B1 | 10/2010 | Cona |
| 8,595,798 B2 | 11/2013 | Anand |
| 8,635,673 B2 | 1/2014 | Anand |
| 9,041,812 B2 | 5/2015 | Billau |

(Continued)

FOREIGN PATENT DOCUMENTS

| CN | 114327577 A | * | 4/2022 |
| WO | 2015118455 A1 | | 8/2015 |

OTHER PUBLICATIONS

OpenFin, "OpenFin API diagnosics", 2021, Openfin (Year: 2021).*

(Continued)

*Primary Examiner* — Hossain M Morshed
(74) *Attorney, Agent, or Firm* — Moore & Van Allen PLLC; Nicholas C. Russell

(57) ABSTRACT

Systems, methods, and computer program products are provided for providing automatic diagnostics of API configuration. The method includes receiving a local module log relating to one or more changes to code of a local device that would affect an API configuration. The method also includes identifying one or more expected local module logs based at least in part on one or more previous local module logs associated with the local device. The method further includes comparing the local module log with the one or more expected local module logs. The comparison determines any differences between the local module log and the one or more expected local module logs. The method still further includes generating an API configuration diagnostic action based on determining a difference between the local module log and the expected local module log(s). The method also includes causing an execution of the API configuration diagnostic action.

20 Claims, 7 Drawing Sheets

(56) References Cited

U.S. PATENT DOCUMENTS

| | | | |
|---|---|---|---|
| 9,396,091 B2* | 7/2016 | Bally | G06F 11/3684 |
| 9,836,320 B2 | 12/2017 | Williams | |
| 9,875,239 B2 | 1/2018 | Victor | |
| 9,967,319 B2 | 5/2018 | Savelieva | |
| 9,973,484 B2 | 5/2018 | Reid | |
| 10,033,702 B2 | 7/2018 | Ford | |
| 10,181,048 B2 | 1/2019 | Malik | |
| 10,528,454 B1* | 1/2020 | Baraty | G06F 11/3684 |
| 10,574,540 B2 | 2/2020 | Sambandam | |
| 10,579,966 B1* | 3/2020 | Willson | G06F 8/20 |
| 10,706,302 B2 | 7/2020 | Surendran | |
| 10,747,621 B2 | 8/2020 | Natanzon | |
| 10,983,759 B1* | 4/2021 | Kumar | G06F 9/54 |
| 11,270,025 B2 | 3/2022 | Arnold | |
| 11,341,838 B1 | 5/2022 | Khmelev | |
| 11,438,353 B2 | 9/2022 | Dinh | |
| 11,468,671 B2 | 10/2022 | Guzik | |
| 11,477,616 B2 | 10/2022 | Guzik | |
| 2013/0339801 A1* | 12/2013 | Ramaiah | G06F 11/079 714/45 |
| 2015/0195128 A1 | 7/2015 | Kim | |
| 2015/0372887 A1 | 12/2015 | Inamdar | |
| 2015/0373040 A1 | 12/2015 | Sander | |
| 2016/0335168 A1* | 11/2016 | Freiberg | G06F 11/3604 |
| 2018/0063205 A1 | 3/2018 | French | |
| 2018/0182052 A1 | 6/2018 | Panagos | |
| 2019/0079844 A1* | 3/2019 | Li | G06F 11/08 |
| 2020/0410386 A1* | 12/2020 | Loving | G06F 16/211 |
| 2021/0311765 A1 | 10/2021 | Subramanian | |
| 2022/0171632 A1 | 6/2022 | Guzik | |

OTHER PUBLICATIONS

Tagliaferri, "How To Use Logging in Python 3", 2021, Python Development (Year: 2021).*

Amann, "Investigating Next Steps in Static API-Misuse Detection", 2019, IEEE (Year: 2019).*

Minh, "Data-centric API configuration: inconsistency detection and diagnosis", 2021, University of Helsinki (Year: 2021).*

Cinque, "Microservices Monitoring with Event Logs and Black Box Execution Tracing", 2022, IEEE (Year: 2022).*

* cited by examiner

SYSTEM AND METHOD FOR PROVIDING AUTOMATIC DIAGNOSTICS OF API CONFIGURATION

TECHNOLOGICAL FIELD

An example embodiment relates generally to API configuration diagnostics, and more particularly, to providing automatic diagnostics of API configuration.

BACKGROUND

APIs are often a combination of multiple microservices that each have a specific service. With an increasing reliance on such microservices, there is an increase in the potential failure points that may exist within an API. The increase in the amount of API configurations has also increased the need for a way to monitor individual applications effectively. There exists a need for a system that can provide API configuration diagnostics.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for providing automatic diagnostics of API configuration is provided. The system includes at least one non-transitory storage device and at least one processing device coupled to the at least one non-transitory storage device. The at least one processing device is configured to receive a local module log relating to one or more changes to code of a local device that would affect an API configuration. The at least one processing device is also configured to identify one or more expected local module logs based at least in part on one or more previous local module logs associated with the local device. The at least one processing device is further configured to compare the local module log with the one or more expected local module logs. The comparison determines any differences between the local module log and the one or more expected local module logs. The at least one processing device is still further configured to generate an API configuration diagnostic action based on determining a difference between the local module log and at least one of the one or more expected local module logs. The at least one processing device is also configured to cause an execution of the API configuration diagnostic action.

In some embodiments, the API configuration diagnostic action includes causing a transmission of a notification including the difference between the local module log and at least one of the expected local log modules. In some embodiments, the API configuration diagnostic action includes replacing a portion of the code on the local device that was changed with a portion of code included in one of the one or more expected local module logs. In some embodiments, the at least one processing device is further configured to generate an expected local module log based on one or more previous local module logs associated with the code of the local device.

In some embodiments, the at least one processing device is further configured to install a local module on the local device. In such an embodiment, the local module is configured to record the local module log. In some embodiments, the local module is configured to log any changes to the code of the local device. In some embodiments, the local module log includes at least one of a local server log, a bit-bucket config log, a deployment log, a virtual server log, a run time log, a cache logs, or a performance log.

In another example embodiment, a computer program product for providing automatic diagnostics of API configuration is provided. The computer program product includes at least one non-transitory computer-readable medium having computer-readable program code portions embodied therein. The computer-readable program code portions include an executable portion configured to receive a local module log relating to one or more changes to code of a local device that would affect an API configuration. The computer-readable program code portions also include an executable portion configured to identify one or more expected local module logs based at least in part on one or more previous local module logs associated with the local device. The computer-readable program code portions further include an executable portion configured to compare the local module log with the one or more expected local module logs. The comparison determines any differences between the local module log and the one or more expected local module logs. The computer-readable program code portions still further include an executable portion configured to generate an API configuration diagnostic action based on determining a difference between the local module log and at least one of the one or more expected local module logs. The computer-readable program code portions also include an executable portion configured to cause an execution of the API configuration diagnostic action.

In some embodiments, the API configuration diagnostic action include causing a transmission of a notification including the difference between the local module log and at least one of the expected local log modules. In some embodiments, the API configuration diagnostic action include replacing a portion of the code on the local device that was changed with a portion of code included in one of the one or more expected local module logs. In some embodiments, the computer-readable program code portions include an executable portion configured to generate an expected local module log based on one or more previous local module logs associated with the code of the local device.

In some embodiments, the computer-readable program code portions include an executable portion configured to install a local module on the local device, wherein the local module is configured to record the local module log. In some embodiments, the local module is configured to log any changes to the code of the local device. In some embodiments, the local module log includes at least one of a local server log, a bit-bucket config log, a deployment log, a virtual server log, a run time log, a cache logs, or a performance log.

In still another example embodiment, a method for providing automatic diagnostics of API configuration is provided. The method includes receiving a local module log relating to one or more changes to code of a local device that would affect an API configuration. The method also includes identifying one or more expected local module logs based at least in part on one or more previous local module logs associated with the local device. The method further includes comparing the local module log with the one or more expected local module logs. The comparison determines any differences between the local module log and the one or more expected local module logs. The method still further includes generating an API configuration diagnostic action based on determining a difference between the local module log and at least one of the one or more expected local module logs. The method also includes causing an execution of the API configuration diagnostic action.

In some embodiments, the API configuration diagnostic action includes causing a transmission of a notification including the difference between the local module log and at least one of the expected local log modules. In some embodiments, the API configuration diagnostic action includes replacing a portion of the code on the local device that was changed with a portion of code included in one of the one or more expected local module logs. In some embodiments, the method also includes generating an expected local module log based on one or more previous local module logs associated with the code of the local device.

In some embodiments, the method also includes installing a local module on the local device, wherein the local module is configured to log any changes to the code of the local device. In some embodiments, the local module log includes at least one of a local server log, a bit-bucket config log, a deployment log, a virtual server log, a run time log, a cache logs, or a performance log.

Embodiments of the present disclosure address the above needs and/or achieve other advantages by providing apparatuses (e.g., a system, computer program product and/or other devices) and methods for providing automatic diagnostics of API configuration. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
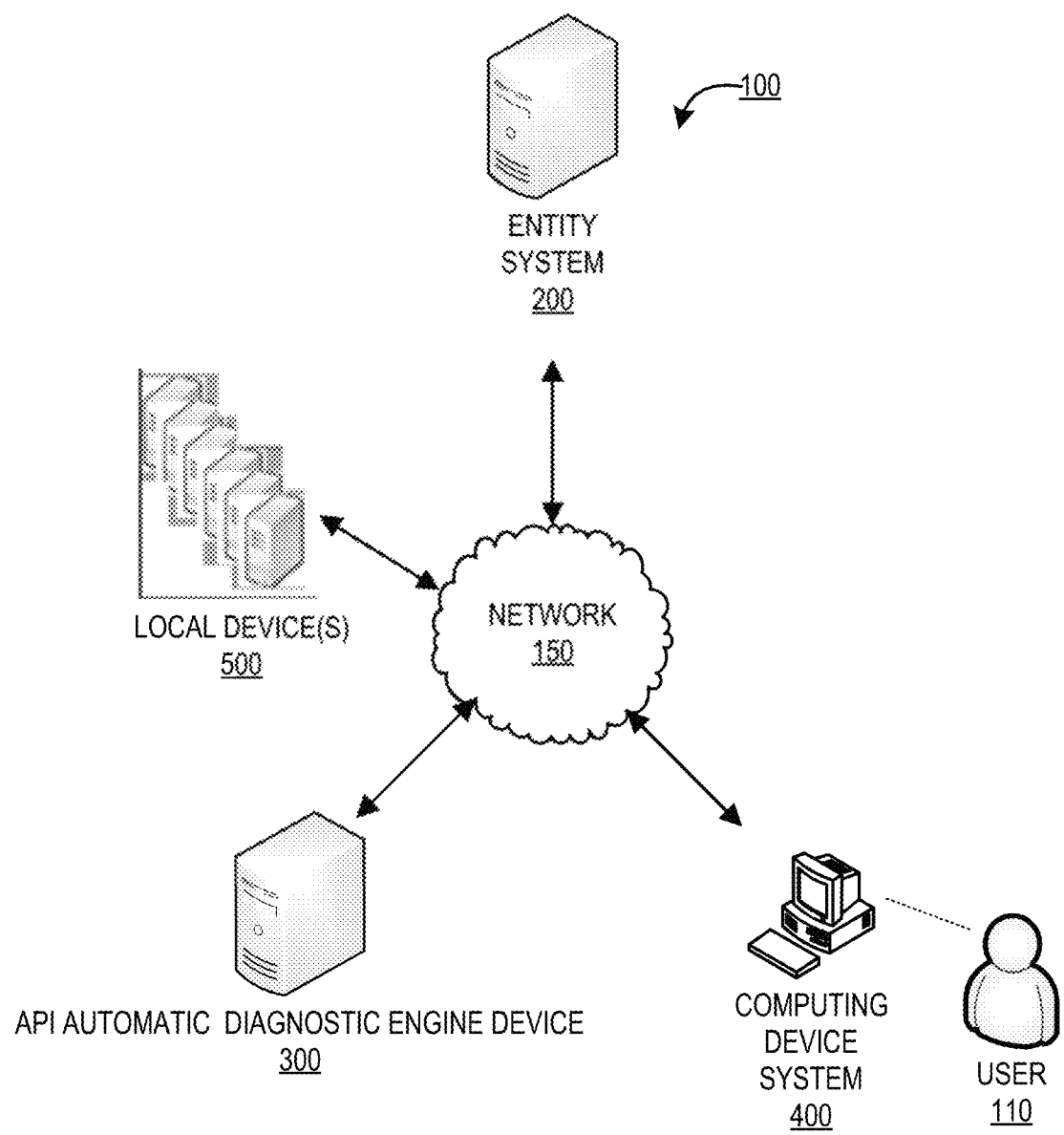
Figure 2:
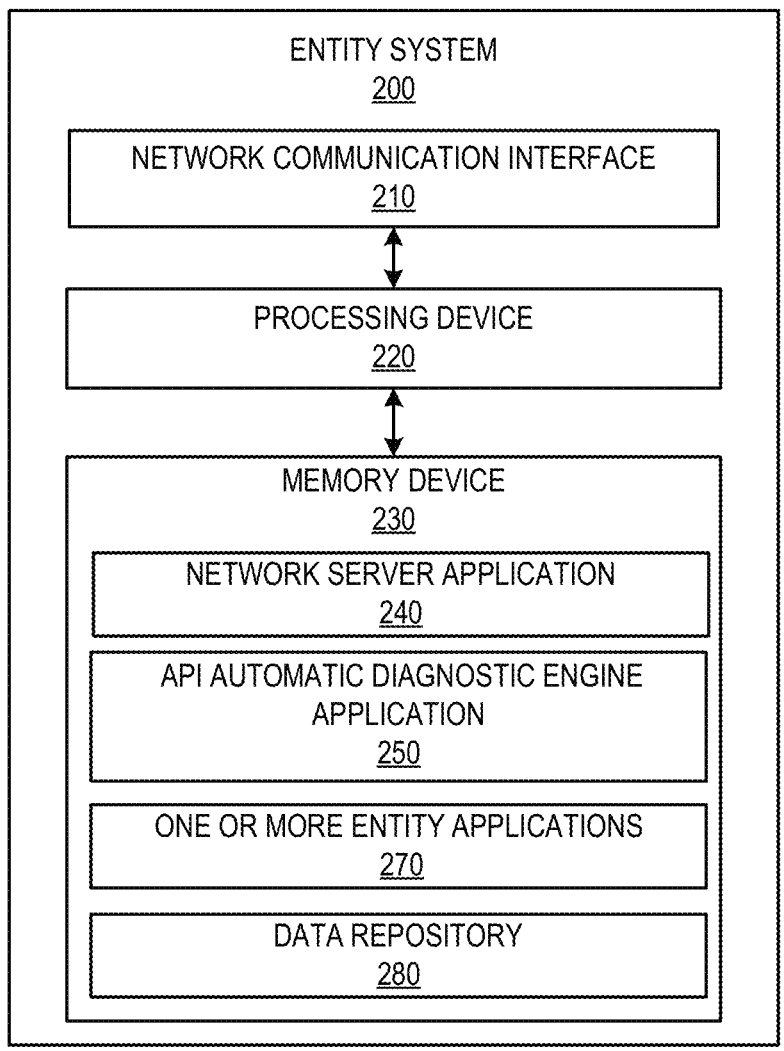
Figure 3:
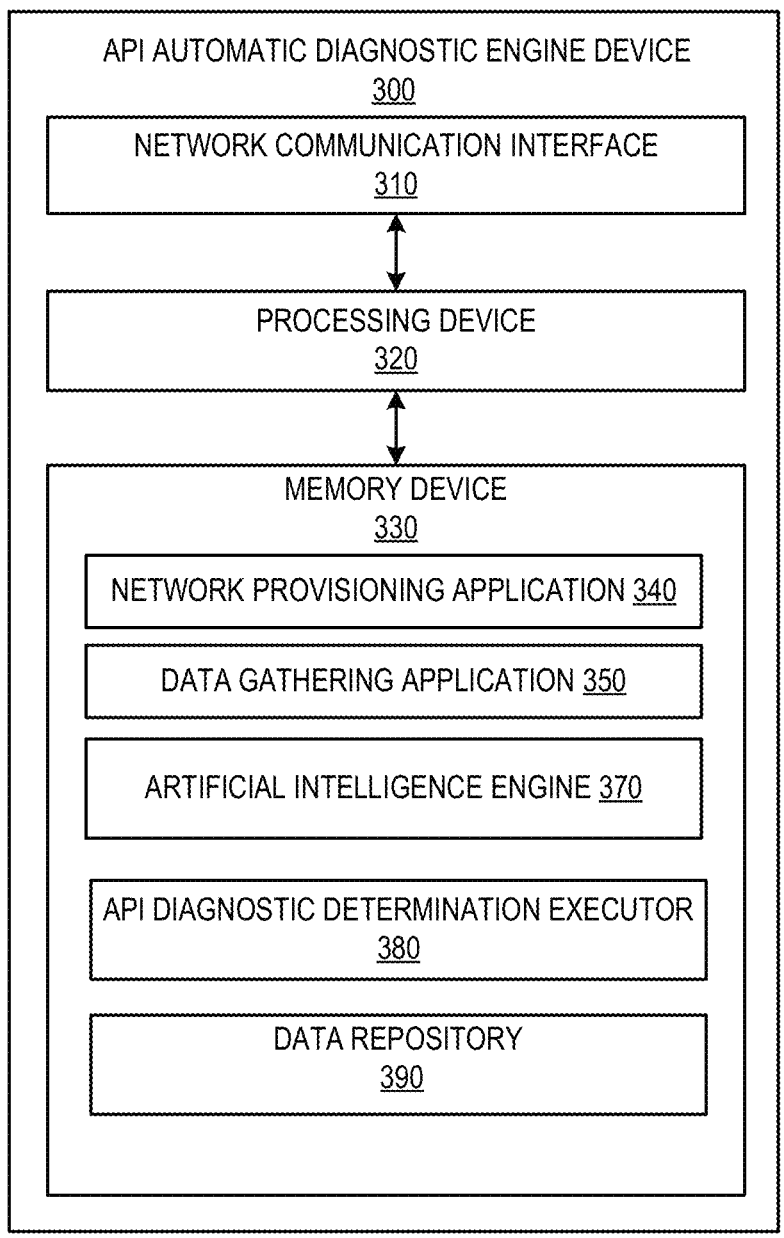
Figure 4:
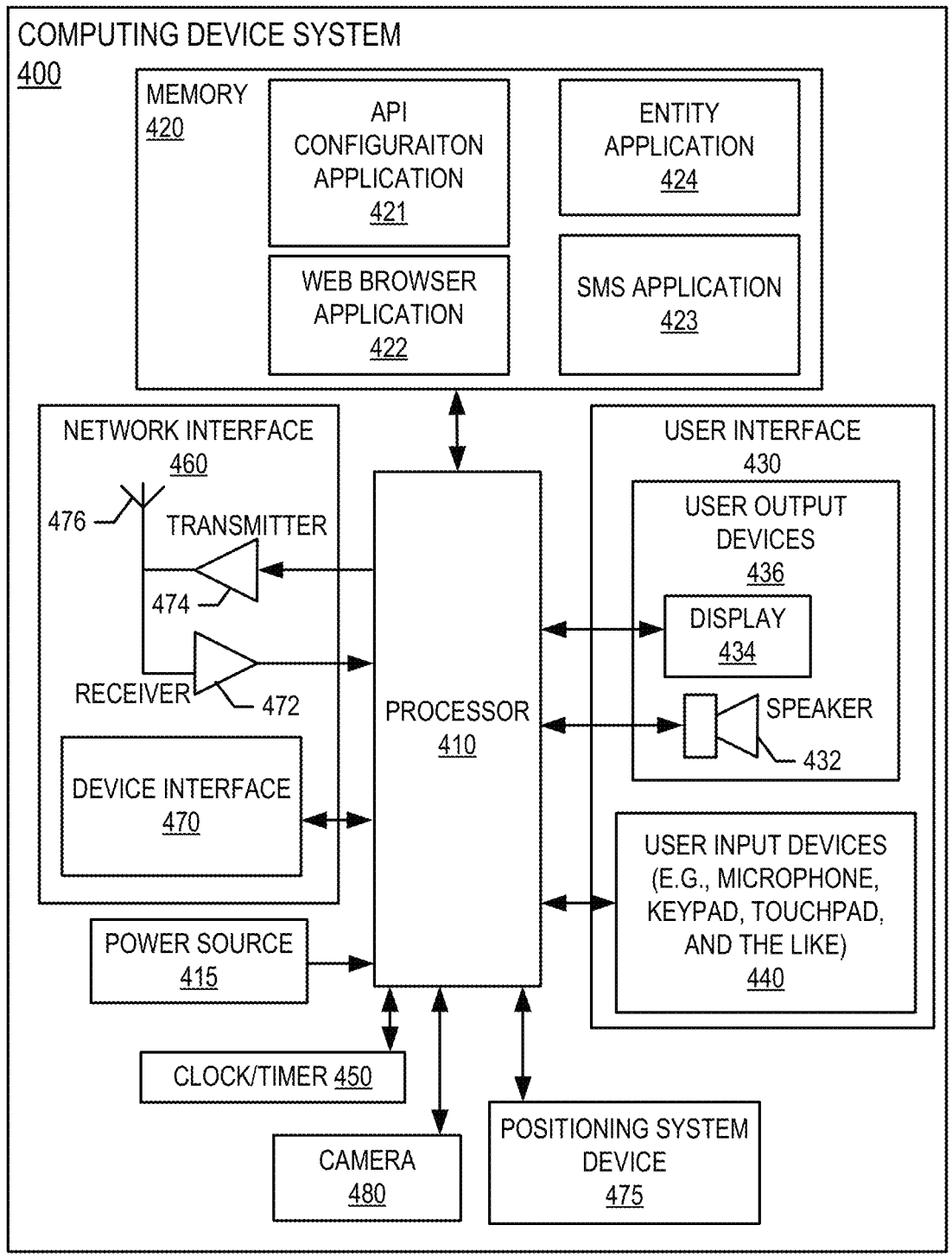
Figure 5:
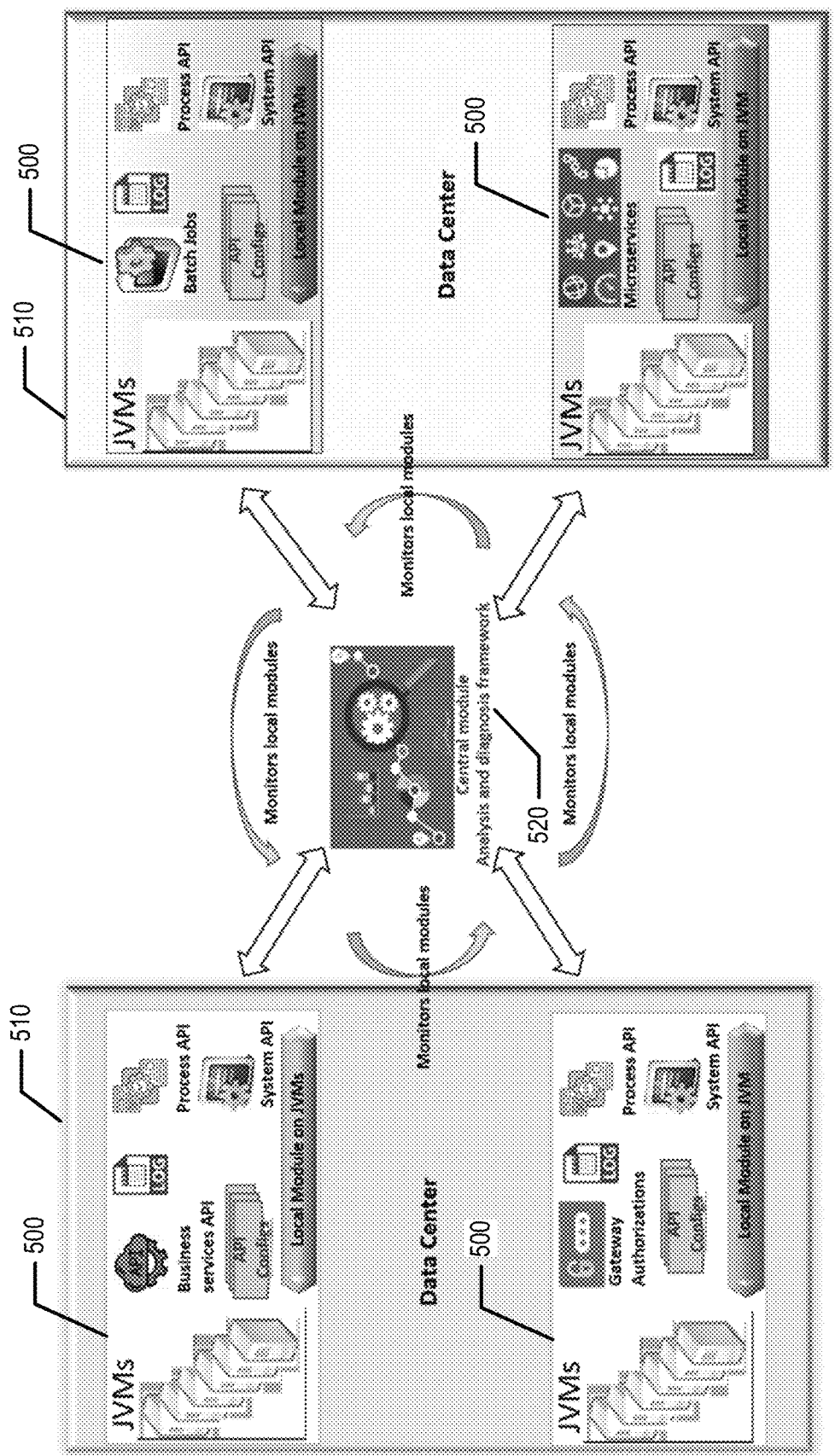
Figure 6:
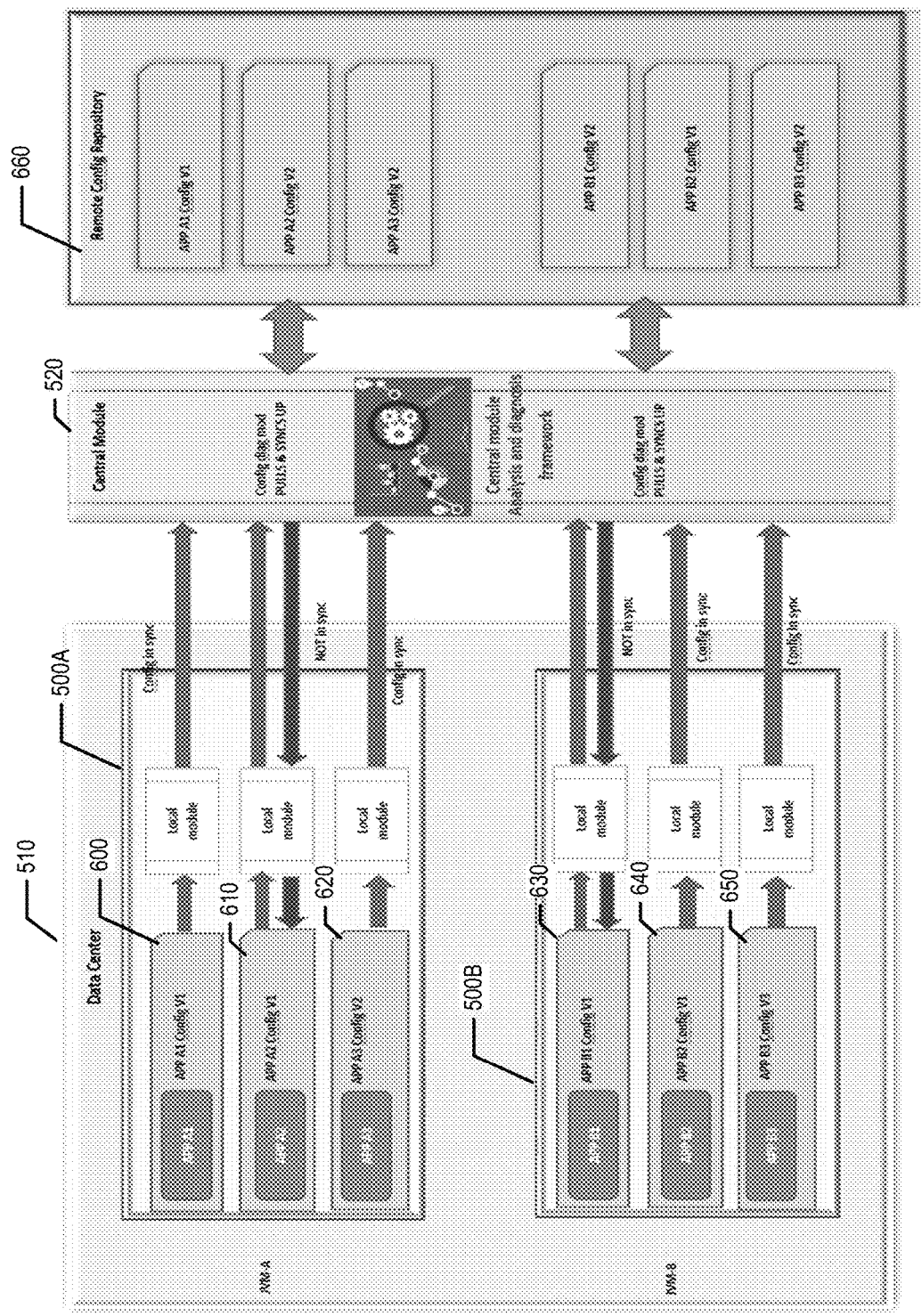
Figure 7:
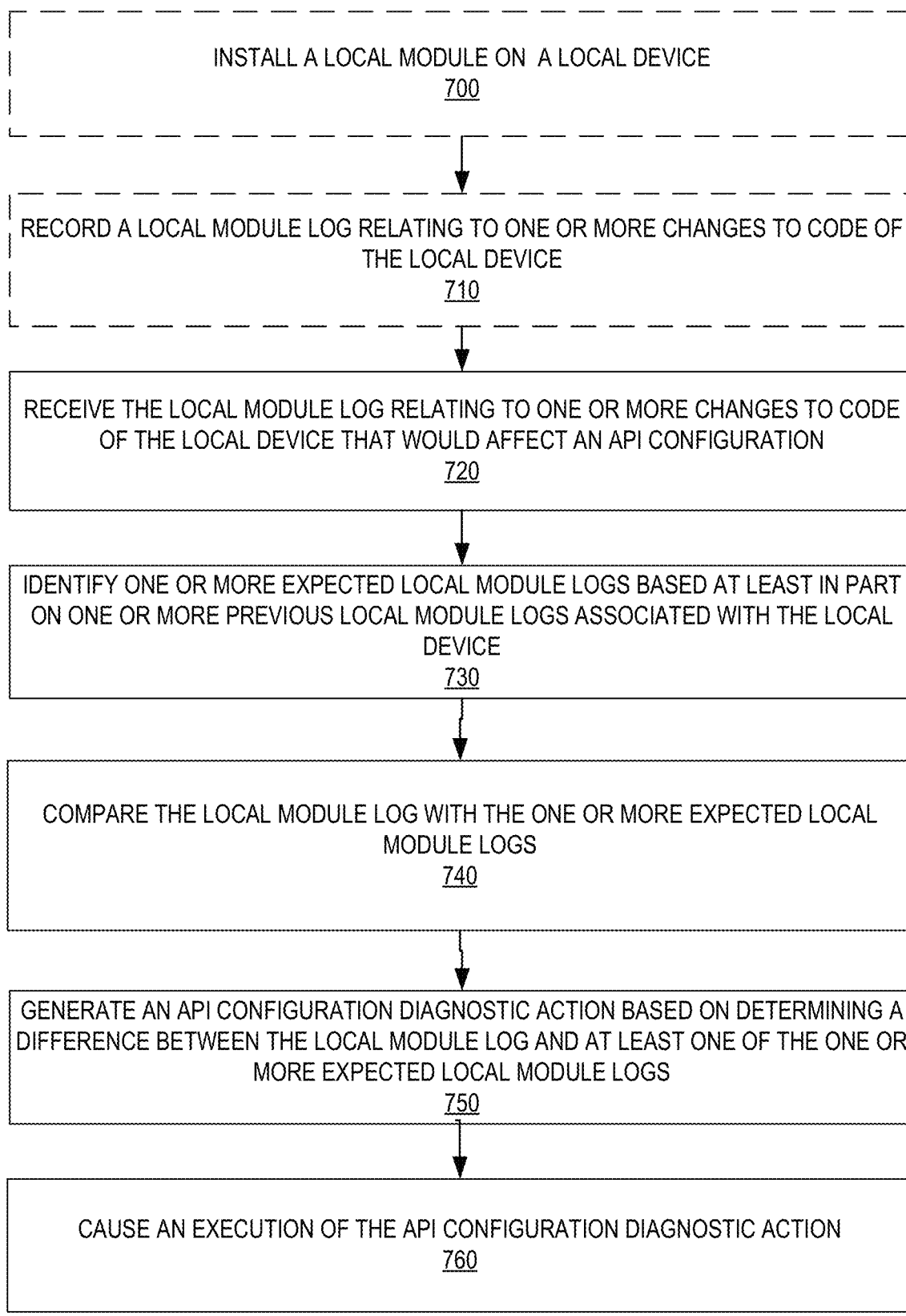

Having thus described embodiments of the disclosure in general terms, reference will now be made the accompanying drawings, wherein:

FIG. 1 provides a block diagram illustrating a system environment for providing automatic diagnostics of API configuration, in accordance with embodiments of the present disclosure;

FIG. 2 provides a block diagram illustrating the entity system 200 of FIG. 1, in accordance with embodiments of the present disclosure;

FIG. 3 provides a block diagram illustrating an API automatic diagnostic engine device 300 of FIG. 1, in accordance with embodiments of the present disclosure;

FIG. 4 provides a block diagram illustrating the computing device system 400 of FIG. 1, in accordance with embodiments of the present disclosure; and FIG. 5 provides a block diagram illustrating communication between data centers containing one or more local devices 500 and the API automatic diagnostic engine device 300 in accordance with embodiments of the present disclosure;

FIG. 6 provides a block diagram illustrating the method of providing automatic diagnostics of API configuration, in accordance with embodiments of the present disclosure; and FIG. 7 provides a flowchart illustrating a method of providing automatic diagnostics of API configuration, in accordance with embodiments of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Application configuration management is difficult due to the evolution of hosting platforms and microservices model. With microservices model, an organization has to deal with up to 10 times more individual applications and, by extension, the configuration of each application. With the evolution of the hosting platforms, there is an increase in the number of local devices, such as virtual servers (e.g., JAVA virtual servers ("JVMs")), to manage. Based on the increase in individual applications and servers, a single organization or entity may have more than 100 API configurations to manage. The increase in individual configurations force entities to increase spending (e.g., higher employee count, higher maintenance costs, etc.) and increases the security hazards involved from multiple individual application sources.

Micro service applications are autonomous applications that are directed to providing specific services. APIs are the framework for how the micro service applications interact together to result in a monolithic web service. The rise in virtual servers has increased the amount of micro service applications used and therefore has increased the amount of API configurations necessary to accommodate the increase. As APIs have more configurations, the number of potential failure points that can cause an API to fail during operation also increases. For example, an API may fail due to a mismatch in configuration files, version mismatching, inaccurate configuration files, and/or configurations not being loaded correctly due to virtual system failures. Therefore, there exists a need for a system for automatic diagnostic of API configuration to avoid system failures.

Various embodiments of the present disclosure provide a system for providing automatic diagnostics of API configuration. The system may include a framework configured to be deployed across multiple devices editing, storing, and/or running API configuration. For example, the framework may be installed on a user device, a source control system, build machines, and/or API hosting platforms. The system includes three modules (a local module, a central module, and an analysis module) configured to detect any potential issues with an API configuration.

The local module runs on any local devices storing, editing, and/or running API configurations. The local module logs any change to the device that changes the API configuration or potentially could change the API configuration. These changes are logged and transmitted to the central module, which monitors the logs for changes between previous versions and recommends or takes proactive diagnosis actions based on the given changes. The analysis module uses a machine learning model that is feed with logs from multiple local modules and central modules, in order to provide actionable inputs to the other modules. Example logs analyzed by the analysis module during the machine learning process may include local server logs, bit-bucket config logs, deployment logs during and after deployment, virtual server logs, run time logs, cache logs, performance logs, and/or the like. The system provides automatic API configuration in real-time and predicts future API configuration issues.

FIG. 1 provides a block diagram illustrating a system environment 100 for providing automatic diagnostics of API configuration. As illustrated in FIG. 1, the environment 100 includes an API automatic diagnostic engine device 300, one or more local device(s) 500, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The API automatic diagnostic engine device 300 is a system of the present disclosure for performing one or more process steps described herein. In some embodiments, the API automatic diagnostic engine device 300 may be an independent system. In some embodiments, the API automatic diagnostic engine device 300 may be a part of the entity system 200. For example, the methods discussed herein may be carried out by the entity system 200, the API automatic diagnostic engine device 300, the computing device system 400, the local device(s) 500, and/or a combination thereof.

The local device(s) 500 are any devices that store, edit, or executes API configuration. local device(s) 500 include user devices (e.g., computing device 400), source control systems, virtual servers, build machines, API hosting platforms, physical servers, and/or the like. The local device(s) may be equipped with a local module that logs any changes to API configuration. The local device also includes communication capabilities to spend the recorded logs to the API automatic diagnostic engine device 300 for API diagnostics as discussed herein. The transmission of the logs may be via the network 150.

The API automatic diagnostic engine device 300, the entity system 200, the computing device system 400, and the local device(s) 500 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the API automatic diagnostic engine device 300 is configured to communicate information or instructions with the entity system 200, the computing device system 400, and/or the local device(s) 500 across the network 150. While the entity system 200, the API automatic diagnostic engine device 300, the computing device system 400, and local device(s) are illustrated as separate components communicating via network 150, one or more of the components discussed here may be carried out via the same system (e.g., a single system may include the entity system 200 and the API automatic diagnostic engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the API automatic diagnostic engine device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an API automatic diagnostic engine device application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the API automatic diagnostic engine device application 250, the one or more entity application 270 to perform certain logic, data-extraction, and data-storing functions of the entity system 200 described herein, as well as communication functions of the entity system 200.

The network server application 240, the API automatic diagnostic engine device application 250, and the one or more entity applications 270 are configured to store data in the data repository 280 or to use the data stored in the data repository 280 when communicating through the network communication interface 210 with the API automatic diagnostic engine device 300, and/or the computing device system 400 to perform one or more process steps described herein. In some embodiments, the entity system 200 may receive instructions from the API automatic diagnostic engine device 300 via the API automatic diagnostic engine device application 250 to perform certain operations. The API automatic diagnostic engine device application 250 may be provided by the API automatic diagnostic engine device 300. The one or more entity applications 270 may be any of the applications used, created, modified, facilitated, and/or managed by the entity system 200. The API Automatic diagnostic engine application 250 may be in communication with the API Automatic diagnostic engine 250. In some embodiments, portions of the methods discussed herein may be carried out by the entity system 200.

FIG. 3 provides a block diagram illustrating the API automatic diagnostic engine device 300 in greater detail, in accordance with various embodiments. The API automatic diagnostic engine device 300 may include or be in communication with the central module and/or the analysis module discussed herein. The API automatic diagnostic engine device 300 is configured to receive logs from local modules (e.g. local modules may be installed on the local device(s) 500).

As illustrated in FIG. 3, in one embodiment, the API automatic diagnostic engine device 300 includes one or more processing devices 320 operatively coupled to a network communication interface 310 and a memory device 330. In certain embodiments, the API automatic diagnostic engine device 300 is operated by an entity, such as a financial institution. In some embodiments, the API automatic diagnostic engine device 300 is owned or operated by the entity of the entity system 200. In some embodiments, the API automatic diagnostic engine device 300 may be an independent system. In alternate embodiments, the API automatic diagnostic engine device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the API automatic diagnostic engine device 300 described herein. For example, in one embodiment of the API automatic diagnostic engine device 300, the memory device 330 includes, but is not limited to, a network provisioning application 340, a data gathering application 350, an artificial intelligence engine 370, an API diagnostic determination executor 380, and a data repository 390 comprising any data processed or accessed by one or more applications in the memory device 330. The computer-executable program code of the network provisioning application 340, the data gathering application 350, the artificial intelligence engine 370, and the API diagnostic determination executor 380 may instruct the processing device 320 to perform certain logic, data-processing, and data-storing functions of the API automatic diagnostic engine device 300 described herein, as well as communication functions of the API automatic diagnostic engine device 300.

The network provisioning application 340, the data gathering application 350, the artificial intelligence engine 370, and the API diagnostic determination executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the API diagnostic determination executor 380 may store the data extracted or received from the entity system 200, the computing device system 400, and/or the local device(s) 500 in the data repository 390. In some embodiments, the network provisioning application 340, the data gathering application 350, the artificial intelligence engine 370, and the API diagnostic determination executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned. The computing device system 400 of various embodiments may be capable of rendering an API configuration.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an API configuration application 421, entity application 424. These applications also typically instructions to a graphical user interface (GUI) on the display 430 that allows the user 110 to interact with the entity system 200, the API automatic diagnostic engine device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the API configuration application 421 provided by the API automatic diagnostic engine device 300 allows the user 110 to access the API automatic diagnostic engine device 300. In some embodiments, the entity application 424 provided by the entity system 200 and the API configuration application 421 allow the user 110 to access the functionalities provided by the API automatic diagnostic engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates the communication between data centers 510 containing one or more local devices 500 and the central module 520 (e.g., the API automatic diagnostic engine device 300). As shown, each data center 510 may include one or more local devices 500. In this example, there are two data centers 510 that are both in communication with the central module 520. Each data center 510 has a plurality of local devices 500 (virtual servers in this example). The local devices 500 may be dedicated to different operations (e.g., the local devices include business service API machines, batch job machines, gateway authentication machines, and/or various other microservice machines). Each of the local devices is equipped with a local module that logs any changes to the code of the local device that may potentially affect API configuration. The recorded local module logs are transmitted to the central module 520, where they are analyzed as discussed herein. As shown, multiple local devices 500 can transmit logs to the same central module 520. As such, the central module 520 can be configured to analyze multiple change logs. Additional central modules may also be used in various embodiments.

Referring now to FIG. 6, an example analysis by the central module is shown in accordance with various embodiments. As shown, the data center 510 has multiple local devices 500A, 500B that each have local modules that transmit local module logs to the central module 520. For example, the central module 520 (e.g., the API automatic diagnostic engine device 300) receives local module logs 600, 610, 620 from the first local device 500A (e.g., a JVM). The local module logs are received by the central module 520 from each of the local modules installed on the local device 500A. The local device 500A may have multiple local modules as shown or a singular local module that records all local module logs for a given local device. The central module 520 then compares the local module logs with an expected local module log. The expected local module may be generated using a machine learning model by the analysis model (e.g., stored in the memory of the API automatic diagnostic engine device 300 or the entity system device 200). The expected local module log may be based on previous local module logs from the same or similar local device stored on the remote config repository 660 (e.g., data repository 390). As shown, local module logs 600 and 620 match the remote config repository values (e.g., the values in the expected local module log), while local module log 610 is different (e.g., APP A2 Config V1 instead of APP A2 Config V2). The difference may indict an issue with the code of the local device. The central module 520 may flag the mismatch. The flagged mismatch may be reviewed either automatically (e.g., the correct version may be determined by a processor) or manually (e.g., a user may review the difference and approve or reject the intended change).

Similarly, the central module 520 receives local module logs 630, 640, and 650 from the second local device 500B. The local module logs are received by the central module from local modules installed on the local device 500B. The local device 500B may have multiple local modules as shown or a singular local module that records all local module logs for a given local device. Like the local module logs from the first local device 500A, the local module logs received from the second local device 500B are also compared to an expected local module log. The expected local module may be generated using a machine learning model by the analysis model (e.g., stored in the remote config repository 660 of the API automatic diagnostic engine device 300 or the entity system device 200). The expected local module log may be based on previous local module logs from the same or similar local device stored on the remote config repository 660 (e.g., data repository 390). As shown, local module logs 640 and 650 match the remote config repository values (e.g., the values in the expected local module log), while local module log 630 is different (e.g., APP B1 Config V1 instead of APP B1 Config V2). The central module 520 may flag the mismatch. The flagged mismatch may be reviewed either automatically (e.g., the correct version may be determined by a processor) or manually (e.g., a user may review the difference and approve or reject the intended change).

Referring now to FIG. 7, a method of providing automatic diagnostics of API configuration is provided. The method may be carried out by a system discussed herein (e.g., the entity system 200, the API automatic diagnostic engine device 300, the computing device system 400, and/or the local device(s) 500). An example system may include at least one non-transitory storage device and at least one processing device coupled to the at least one non-transitory storage device. In such an embodiment, the at least one processing device is configured to carry out the method discussed herein.

Referring now to optional Block 700 of FIG. 7, the method includes installing a local module on a local device. The local module is configured to record local module log(s) discussed below in reference to Block 710 and 720. The local module may be stored and subsequently ran on any devices storing, editing, and/or running API configurations. For example, the local module could be installed on a user device, a source control system, build machines, and/or API hosting platforms. The local module records any change to the code of a local device that could change the API configuration in one or more local module logs. Local modules may be installed on multiple local devices with each local module being in communication with a central module, as discussed herein. For example, each local device that provides a microservice for an API may have a local module installed and have any changes analyzed as discussed herein.

Referring now to optional Block 710 of FIG. 7, the method includes recording a local module log relating to one or more changes to code of the local device. The local module (when installed on a local device) may be configured to monitor the local device for any changes that would affect the API configuration (e.g., changing to coding that would change the size of a specific application). The local module may record one or more different types of local module logs. The local modules may include a local server log, a bit-bucket config log, a deployment log, a virtual server log, a run time log, a cache logs, and/or a performance log. Each local device may have multiple local modules logging different types of logs (e.g., a local device may have a local module recording a virtual server log and a local module recording a performance log). Additionally or alternatively, one local module may be recording multiple local module logs simultaneously. In some embodiments, the local module log may include at least a portion of the code of the local device itself (e.g., for comparison with previous code).

The local module log may be stored as a local file in addition to being sent to the central module. The local module log may also include information relating to the changes to the code, such as code version number, configuration type, file type, time and date of the change, user that changed the code, and/or the like. The information relating to the changes to the code may be stored as metadata.

Referring now to Block 720 of FIG. 7, the method includes receiving the local module log relating to one or more changes to the code of the local device that would affect an API configuration. The central module may receive the local module log(s) from the local module(s) (as shown in FIGS. 5 and 6). The central module may be a part of the entity system 200 and/or the API automatic diagnostic engine device 300. The central module may be in communication with a plurality of local modules (e.g., the central module may receive local module logs from multiple local devices).

Referring now to Block 730 of FIG. 7, the method includes identifying one or more expected local module logs based at least in part on one or more previous local module logs associated with the local device. The expected local module log represents the code of the local device that was expected to be receive from the local module. The expected local module log may be based at least in part on previous local module logs and/or previous codes provided to the system from the local device. The expected local module log may also be based at least in part on the code version number, configuration type, file type, time and date of the change, user that changed the code, and/or the like. In some embodiments, the expected local module log may be the last version of the local module log received from a given device. The expected local module log(s) may be stored on memory of the entity system 200 and/or the API automatic diagnostic engine device 300.

The method may also include generating one or more expected local module logs. The entity system 200 and/or the API automatic diagnostic engine device 300 may also include an analysis module that is configured to use machine learning to generate the expected local module log(s) based on previous local module logs from the same or similar local device. The analysis module is configured to receive and process previous local module logs through a machine learning model in order to generate the expected local module. As discussed below, the analysis module may also predict recommended revisions to the code of the local device to fix any differences between the local module log(s) and the expected local module log(s).

Referring now to Block 740 of FIG. 7, the method includes comparing the local module log with the one or more expected local module logs. The comparison of the local module log and the one or more expected local module logs determines any differences between the local module log and the one or more expected local module logs. The system may be configured to identify any differences between the local module logs and the expected module logs. Differences may include change in code, different file names, and/or different file types. The comparison may be a one to one comparison (e.g., identifying any differences) or a more complex comparison based on the complexity of the analysis module processing (e.g., the system may monitor the coding style and identify differences between the programmers typical style and the local module log). The comparison may also result in a confidence interval of the code change itself. For example, the comparison may indicate the likelihood of potential failure based on the code change. As discussed below in reference to Block 750, the method may also include analyzing the difference between the local module log with the one or more expected local module logs and recommending/automatically implementing potential changes to the code of the local device.

Referring now to Block 750 of FIG. 7, the method includes generating an API configuration diagnostic action based on determining a difference between the local module log and at least one of the one or more expected local module logs. The API configuration diagnostic action may be a notification transmitted by the system and/or an action taken by the system in response to the difference.

The API configuration diagnostic action may be a notification to one or more users (e.g., programmers) of the differences between the local module log and expected local log module(s). The notification may be merely a notification that a code change has occurred (e.g., a notification to a programmer may state "A code change has occurred on local device A that could affect one or more API configurations"). In some instances, additionally information may also be included in the notification, such as information relating to the code change (e.g., time of change, date of change, programmer making the change, etc.) or recommended changes to the code (e.g., the system may be configured to recommend adjusting the code to match a previous version or fix grammatical errors in the code). The method may also include requesting a response from the user relating to the change. For example, the user may confirm that the code change was intended and correct or the user may flag the code change for review. In an instance the user confirms a code change, the system is configured to implement the newly changed code. However, if the user flags the code for review, the code change may not go live and the system may revert to a pervious code version.

When flagged for review, the local module log and/or the code itself may be analyzed by the user (or another user) that determines whether the code change was intended and/or correct. Said user may then provide the system with a confirmation of the code change or a remedial measure to fix the code change. The remedial measures may include updating the code (e.g., fixing any errors in the code) or reverting to a previous version of the code. The remedial measure may be carried out by the system itself and/or one of the users.

The API configuration diagnostic action may include changing at least a portion of the code of the local device. The portion of the code on the local device that was changed may be replaced with a portion of code included in one of the one or more expected local module log. For example, the code of the local device may be revised to match a previous version of the code. In some embodiments, the system may transmit a request to a user (e.g., a programmer) for confirmation to make any revisions to the code of the local device. For example, the system may request the user confirm that a code change be reverted back to a previous code version. The method may also include predicting reactions between the code change and other microservices used by common API configurations. For example, the system may analysis a change in code of a local device based on the change to an API configuration.

Referring now to Block 760 of FIG. 7, the method includes causing an execution of the API configuration diagnostic action. As discussed above in reference to Block 750, the API configuration diagnostic action may be a notification to a user of the code change of a local device and/or an automatic revision of the code of the local device. As such, the system may be capable of causing the execution of the API configuration diagnostic action. For example, the system may be in communication with one or more user devices that are accessible by users that are intended to receive the API configuration diagnostic notification. Additionally, the system is capable of revision the code of local devices (or sending the revised code to the local device to replace the current code version). For example, in an instance in which the local module log indicates a change to the code, the central module may be configured to transmit the previous version of code to the local device to replace the current code (e.g., if the system or user determines an coding error was made).

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for providing automatic diagnostics of API configuration, the system comprising:
    at least one non-transitory storage device comprising computer program instruction code; and
    at least one processing device coupled to the at least one non-transitory storage device, wherein causing the code to be executed to cause the at least one processing device to:
    receive a local module log relating to one or more changes to code of a local device that would affect an API configuration;
    identify one or more expected local module logs based at least in part on one or more previous local module logs associated with the local device;
    compare the local module log with the one or more expected local module logs, wherein the comparison determines any differences between the local module log and the one or more expected local module logs;
    based on determining a difference between the local module log and at least one of the one or more expected local module logs, generate an API configuration diagnostic action; and
    cause an execution of the API configuration diagnostic action.

2. The system of claim 1, wherein the API configuration diagnostic action comprises causing a transmission of a notification including the difference between the local module log and at least one of the expected local log modules.

3. The system of claim 1, wherein the API configuration diagnostic action comprises replacing a portion of the code on the local device that was changed with a portion of code included in one of the one or more expected local module logs.

4. The system of claim 1, further comprising generating an expected local module log based on one or more previous local module logs associated with the code of the local device.

5. The system of claim 1, further comprising installing a local module on the local device, wherein the local module is configured to record the local module log.

6. The system of claim 5, wherein the local module further comprises logging any changes to the code of the local device.

7. The system of claim 1, wherein the local module log includes at least one of a local server log, a bit-bucket config log, a deployment log, a virtual server log, a run time log, a cache logs, or a performance log.

8. A computer program product for providing automatic diagnostics of API configuration, the computer program product comprising at least one non-transitory computer-readable medium having computer-readable program code portions embodied therein, the computer-readable program code portions comprising:
    an executable portion, executed by at least one processor, configured to receive a local module log relating to one or more changes to code of a local device that would affect an API configuration;
    an executable portion, executed by at least one processor, configured to identify one or more expected local module logs based at least in part on one or more previous local module logs associated with the local device;
    an executable portion, executed by at least one processor, configured to compare the local module log with the one or more expected local module logs, wherein the comparison determines any differences between the local module log and the one or more expected local module logs;
    an executable portion, executed by at least one processor, configured to generate an API configuration diagnostic action based on determining a difference between the local module log and at least one of the one or more expected local module logs; and an executable portion, executed by at least one processor, configured to cause an execution of the API configuration diagnostic action.

9. The computer program product of claim 8, wherein the API configuration diagnostic action comprises causing a transmission of a notification including the difference between the local module log and at least one of the expected local log modules.

10. The computer program product of claim 8, wherein the API configuration diagnostic action comprises replacing a portion of the code on the local device that was changed with a portion of code included in one of the one or more expected local module logs.

11. The computer program product of claim 8, further comprising generating an expected local module log based on one or more previous local module logs associated with the code of the local device.

12. The computer program product of claim 8, further comprising installing a local module on the local device, wherein the local module is configured to record the local module log.

13. The computer program product of claim 12, wherein the local module further comprises logging any changes to the code of the local device.

14. The computer program product of claim 8, wherein the local module log includes at least one of a local server log, a bit-bucket config log, a deployment log, a virtual server log, a run time log, a cache logs, or a performance log.

15. A computer-implemented method for providing automatic diagnostics of API configuration, the method comprising:

receiving a local module log relating to one or more changes to code of a local device that would affect an API configuration;

identifying one or more expected local module logs based at least in part on one or more previous local module logs associated with the local device;

comparing the local module log with the one or more expected local module logs, wherein the comparison determines any differences between the local module log and the one or more expected local module logs;

based on determining a difference between the local module log and at least one of the one or more expected local module logs, generating an API configuration diagnostic action; and causing an execution of the API configuration diagnostic action.

16. The method of claim 15, wherein the API configuration diagnostic action comprises causing a transmission of a notification including the difference between the local module log and at least one of the expected local log modules.

17. The method of claim 15, wherein the API configuration diagnostic action comprises replacing a portion of the code on the local device that was changed with a portion of code included in one of the one or more expected local module logs.

18. The method of claim 15, further comprising generating an expected local module log based on one or more previous local module logs associated with the code of the local device.

19. The method of claim 15, further comprising installing a local module on the local device, wherein the local module further comprises logging any changes to the code of the local device.

20. The method of claim 15, wherein the local module log includes at least one of a local server log, a bit-bucket config log, a deployment log, a virtual server log, a run time log, a cache logs, or a performance log.

* * * * *